United States Patent [19]

Perry

[11] Patent Number: 5,149,755

[45] Date of Patent: Sep. 22, 1992

[54] PREPARATION OF POLY(BENZ(OX, IMID, THI)AZOLE) POLYMERS

[75] Inventor: Robert J. Perry, Pittsford, N.Y.

[73] Assignee: Eastman Kodak Company, Rochester, N.Y.

[21] Appl. No.: 726,437

[22] Filed: Jul. 5, 1991

[51] Int. Cl.$^5$ .................. C08G 73/18; C08G 73/22; C08G 75/32

[52] U.S. Cl. ................... 528/210; 528/125; 528/126; 528/128; 528/211; 528/214; 528/217; 528/220; 528/225; 528/229; 528/373; 528/391; 528/397; 528/422

[58] Field of Search .............. 528/210, 211, 214, 217, 528/125, 126, 128, 220, 225, 229, 373, 391, 397, 422

[56] References Cited

U.S. PATENT DOCUMENTS

| | | | |
|---|---|---|---|
| 4,933,419 | 6/1990 | Perry et al. | 528/86 |
| 4,933,466 | 6/1990 | Perry et al. | 548/476 |
| 4,933,467 | 6/1990 | Perry et al. | 548/476 |
| 4,933,468 | 6/1990 | Perry et al. | 548/476 |

FOREIGN PATENT DOCUMENTS 1-23823  5/1989  Japan .

OTHER PUBLICATIONS

Yoneyama et al, *Macromolecules*, vol. 21, 1988, pp. 1908–1911.

Potts, *Comprehensive Heterocyclic Chemistry*, vol. 6, pp. 321–322, 1989.

*Primary Examiner*—Harold D. Anderson
*Attorney, Agent, or Firm*—Robert Luke Walker

[57] ABSTRACT

A method for the preparation of poly(benzoxazole)s, poly(benzimidazoles)s, and poly(benzthiazole)s. In the presence of solvent and catalyst, reacting carbon monoxide, an aromatic halide reactant having the general formula $X^1$—$Ar^1$—$Z^1$ and an aromatic amine reactant having the general formula $Z^2$—$Ar^2$—$M^1$, wherein $X^1$ and $Z^1$ are non-ortho, $Z^2$ and $M^1$ are non-ortho, one of $Z^1$ and $Z^2$ is $X^2$ and the other one is $M^2$, —$Ar^1$— and —$Ar^2$— are each independently selected from the group consisting of aromatic and heteroaromatic moieties having a total of ring carbons and heteroatoms of from 6 to about 20, $X^1$ and $X^2$ are each independently selected from the group consisting of —I and —Br, and $M^1$ and $M^2$ are each independently selected from moieties having an —$NH_2$ radical and, ortho to the —$NH_2$ radical, a radical selected from the group consisting of —$NH_2$, —OH, and —SH.

20 Claims, No Drawings

PREPARATION OF POLY(BENZ(OX, IMID, THI)AZOLE) POLYMERS

BACKGROUND OF THE INVENTION

The present invention pertains to a process for the preparation of aromatic polymers and more particularly pertains to a process for the preparation of poly(benz-(ox, imid, thi)azole) polymers.

Current methods of poly(benzoxazole), poly(benzimidazole), and poly(benzthiazole) formation involve the condensation of bis(o-aminophenols, amines or thiols) and aromatic diacid derivatives. This presents the shortcoming of a limited variety of available diacids and/or extra synthetic steps necessary to convert the diacid into a suitable derivative. In many cases the derivative is a diacid chloride which is hydrolytically unstable. In some of the methods, phenyl esters are used as the diacid derivatives. During polymerization this leads to the release of free phenol which is toxic.

Japanese Kokai 123823, published May 16, 1989, and Yoneyama et al, *Macromolecules*, Vol. 21, 1988, pp. 1908-1911 disclose the use of a Heck carbonylation reaction in the preparation of low molecular weight polyamides. U.S. Pat. Nos. 4,933,419; 4,933,466 and 4,933,467; and 4,933,468 disclose methods which utilize Heck reactions to produce esters, imides, and imide-amides, respectively. U.S. patent application Ser. No. 07/591,308, filed Oct. 1, 1990, and commonly assigned with this application, discloses use of the Heck carbonylation reaction to produce aryl benz(ox, imid, thi)azoles. Potts, *Comprehensive Heterocyclic Chemistry*, Vol. 6, pp 321-322 (1989) teaches cyclization of a precursor to provide 2-substituted benzothiazoles.

It is therefore highly desirable to provide an improved method for the preparation of poly(benz(ox, imid, thi)azole) polymers.

It is also highly desirable to provide an improved method for the preparation of poly(benz(ox, imid, thi)azole) polymers, which utilizes a Heck carbonylation and coupling reaction of aryl dihalides and bis(o-aminophenols, amines and thiols) rather than the condensation of bis(o-aminophenols, amines or thiols) and aromatic diacid derivatives.

It is also highly desirable to provide an improved method for the preparation of poly(benz(ox, imid, thi)azole) polymers, which avoids the use of hydrolytically unstable diacid chlorides.

It is also highly desirable to provide an improved method for the preparation of poly(benz(ox, imid, thi)azole) polymers, which avoids the use of phenyl esters as the diacid derivatives and the release of free phenol during polymerization.

It is finally highly desirable to provide an improved method for the preparation of poly(benz(ox, imid, thi)azole) polymers which provides all of the above desired features.

SUMMARY OF THE INVENTION

It is an object of the invention to provide an improved method for the preparation of poly(benz(ox, imid, thi)azole) polymers.

It is another object of the invention to provide an improved method for the preparation of poly(benz(ox, imid, thi)azole) polymers, which utilizes a Heck carbonylation and coupling reaction of aryl dihalides and bis(o-aminophenols, amines or thiols) reaction rather than the condensation of bis(o-aminophenols, amines or thiols) and aromatic diacid derivatives.

It is another object of the invention to provide an improved method for the preparation of poly(benz(ox, imid, thi)azole) polymers, which avoids the use of hydrolytically unstable diacid chlorides.

It is another object of the invention to provide an improved method for the preparation of poly(benz(ox, imid, thi)azole) polymers, which avoids the use of phenyl esters as the diacid derivatives and the release of free phenol during polymerization.

It is finally an object of the invention to provide an improved method for the preparation of poly(benz(ox, imid, thi)azole) polymers which provides all of the above desired features.

In the broader aspects of the invention there is provided a method for preparing poly(benzoxazole)s, poly(benzimidazole)s, and poly(benzthiazole)s including the step of reacting, in the presence of solvent and catalyst, carbon monoxide, an aromatic halide reactant having the general formula $X^1—Ar^1—Z^1$ and an aromatic amine reactant having the general formula $Z^2—Ar^2—M^1$, wherein $X^1$ and $Z^1$ are non-ortho, $Z^2$ and $M^1$ are non-ortho, one of $Z^1$ and $Z^2$ is $X^2$ and the other one is $M^2$, $—Ar^1—$ and $—Ar^2—$ are each independently selected from the group consisting of aromatic and heteroaromatic moieties having a total of ring carbons and heteroatoms of from 6 to about 20, $X^1$ and $X^2$ are each independently selected from the group consisting of —I and —Br, and $M^1$ and $M^2$ are each independently selected from moieties having an $—NH_2$ radical and, ortho to the $—NH_2$ radical, a radical selected from the group consisting of $—NH_2$, —OH, and —SH.

DESCRIPTION OF A SPECIFIC EMBODIMENT

Polymers of the classes: poly(benzoxazole), poly(benzimidazole), and poly(benzthiazole) are used in composites and laminates and as high strength fibers and films possessing good thermal and oxidative stability.

In the method of the invention, poly(benz(ox, imid, thi)azole) polymers are prepared by a process in which a first step is a palladium catalyzed carbonylation and condensation of an aromatic halide reactant and an aromatic amine reactant to produce a reaction product and a second step is the cyclization of that reaction product. For convenience, the reaction product of the first step will be referred to herein as the "precyclization polymer" and the product of the second step will be referred to herein as the "cyclized polymer".

The aromatic halide reactant has an aromatic or heteroaromatic residue, which bears a —Br or —I group, hereinafter referred to as an "aromatic halide moiety". The aromatic amine reactant has an aromatic or heteroaromatic residue, which bears an $—NH_2$ group and, ortho to that $—NH_2$ group, an $—NH_2$, —OH, or —SH group. The aromatic $—NH_2$ group and ortho group are referred to collectively by the term: "aromatic amine moiety". The aromatic halide reactant and the aromatic amine reactant each also bear an additional moiety, which, for convenience will be referred to herein as an "active moiety". The active moiety, in the case of the aromatic halide reactant, is preferably non-ortho to the aromatic halide moiety and, in the case of the aromatic amine reactant, is preferably non-ortho to both groups, $—NH_2$ and $—NH_2$, —OH, or —SH, of the aromatic amine moiety.

In a particular embodiment of the method of the invention, the active moiety of the aromatic halide reactant is a second aromatic halide moiety, and the active moiety of the aromatic amine reactant is a second aromatic amine moiety. This embodiment may be described as involving the reaction of an AA monomer with a BB monomer to produce an AABBAABB polymer. In an alternative embodiment of the invention, the active moiety of the aromatic halide reactant is an aromatic amine moiety and the active moiety of the aromatic amine reactant is an aromatic halide moiety. This embodiment may be described as involving the reaction of AB monomer to produce ABABAB polymer. In this embodiment, the terms "aromatic halide reactant" and "aromatic amine reactant" either both refer to the same reactant or arbitrarily designate two different reactants, both of which bear both an aromatic halide moiety and an aromatic amine moiety. For convenience, the term: "aromatic halide-amine reactant" will also be used herein to refer to reactants of this embodiment.

Both of the above embodiments of the "precyclization" of the method of the invention may be summarized as the reaction, in the presence of solvent and a catalyst, of carbon monoxide and an aromatic halide reactant having the general formula

and an aromatic amine reactant having the general formula

In which, $X^1$ and $Z^1$ are non-ortho, $Z^2$ and $M^1$ are non-ortho, one of $Z^1$ and $Z^2$ is $X^2$ and the other one is $M^2$, $-X^1$ and $-X^2$ are each independently selected from the group consisting of $-I$ and $-Br$, $-M^1$ and $-M^2$ are each independently selected from moieties having an $-NH_2$ radical and, ortho to said $-NH_2$ radical, a radical selected from the group consisting of $-NH_2$, $-OH$, and $-SH$.

$-Ar^1-$ and $-Ar^2-$ are each independently selected and are each arylene or heteroarylene moieties having a total of ring carbons and heteroatoms of from 6 to about 20. Suitable arylene and heteroarylene moieties include five and six membered rings and systems in which those five or six membered rings are fused or linked. The linked arylene and heteroarylene ring systems have a direct linkage or a bridge member which will not unsuitably interfere with the method of the invention due to inappropriate cross-reaction, steric hindrance or the like. Suitable bridge members include: alkyl having 1 to 10 carbons, haloalkyl having 1 to 10 carbons, O, S, SO$_2$, carbonyl, aryl, heteroaryl, fused aryl, siloxane, ester, and amide. Example $-Ar^1-$ and $-Ar^2-$groups include: phenyl, biphenyl, naphthalene, anthracene, thiophene, benzothiophene, pyridine, quinoline, furan, dibenzofuran, aromatic sulfones, diaryl ethers, diarylcarbonyls, and diarylsulfides.

Aromatic halides suitable for the AABBAABB embodiment of the method of the invention include aromatic polyhalides. It is desirable that the halides not be bonded to an aromatic nucleus in ortho position. The halides can be bonded to the same or different aromatic rings in the molecule. Aromatic polyhalides having two halogen atoms are desirable, but aromatic compounds having three or more halogen atoms can be used if one wishes to introduce branching, which can affect the rheological and physical properties of the polymer. For, example aromatic trihalides suitable for this embodiment of the method of this invention include: 1,3,5-triiodobenzene; 1,3,5-tribromobenzene; 2-bromo-1,4-diiodobenzene; 1,2,4-tribromobenzene; 2,3,7-tribromonaphthalene; 2,4,8-triiododibenzofuran; 1,2,4-triiodobenzene; 2,3,7-triiodonaphthalene; 2,4,4'-triiododiphenylether; and 3,4,4'-triiodobiphenyl. More desirable, however, are aromatic dihalide reactants such as: 4,4'diiododiphenylether; m-diiodobenzene; m-dibromobenzene; 2,8-diiododibenzofuran; 2,6-diidonaphthalene; p-diiodobenzene; p-dibromobenzene; 4,4'-diiododiphenylsulfone; 4,4'-diidobiphenyl; 4,4'diiodobenzophenone; 4,4'-diiodophenylmethane; 9,9-Bis(4-iodophenyl)-fluorene; 2,2-Bis(4-iodophenyl)propane; 2,2-bis(4-iodophenyl)hexafluoropropane; 5-iodo-3-(4-iodophenyl)-1,1,3-trimethylindane; 3,4'-diiododiphenylether; and 4,4'-dibromodiphenylsulfone.

Aromatic amines suitable for that embodiment of the method of the invention include compounds having a pair of benzene rings, each substituted with an "aromatic amine moiety", joined together by a direct linkage or a bridge member. The bridge member can be an alkyl or haloalkyl group of 1-10 carbons or O, S, SO$_2$, CO, arylene, heteroarylene, fused arylene, siloxane, ester, or amide group. Other aromatic amines suitable for this embodiment of the method of the invention include compounds having a single or fused arylene or heteroarylene nucleus and diamino, dihydroxy or dithio 3,3'-substituted 4,4'-diaminobiphenyls. Specific compounds suitable for use as the aromatic amine reactant of the method of this invention include: 3,3',4,4'-tetraminobiphenyl; 3,3'dihydroxy-4,4'-diaminobiphenyl; 2,2-bis(3-amino-4-hydroxyphenyl) hexafluoropropane, 3,3'-di(thio)4,4'-diaminobiphenyl; 3,3'diamino-4,4'-dihydroxybiphenyl; 1,4-diamino-2,5-dihydroxybenzene; 1,5-diamino-2,4-dihydroxybenzene; 1,4-diamino-2,5-dithiobenzene; 1,5-diamino-2,4-dithiobenzene; and 3,3'-diamino-4,4'-dithiobiphenyl.

In a particular embodiment of the method of the invention, both aromatic halide moieties of the aromatic halide reactant are the same and both aromatic amine moieties of the aromatic amine reactant are the same. In a particular embodiment of the invention, the aromatic halide reactant is an aromatic dihalide and the aromatic amine reactant is a benzidine, that is, a 4,4'-diaminobiphenyl, which is diamino, dihydroxy or dithio 3,3'-substituted.

In the alternative ABAB embodiment of the invention, in which the active moiety of the aromatic halide reactant is an aromatic amine moiety and the active moiety of the aromatic amine reactant is an aromatic halide moiety, suitable aromatic halide-amine reactants include compounds having an arylene, fused arylene and heteroarylene nucleus, or a nucleus having two aryl groups joined together by a direct link or a linking group. The linking group can be an alkyl or haloalkyl group of 1-10 carbons or O, S, SO$_2$, CO, arylene, heteroarylene, fused arylene, siloxane, ester, or amide group. Specific compounds suitable for use as a aromatic halide-amine reactant of the method of this invention include: 2-amino-4-iodophenol; 2-amino-4-bromophenol; 2-amino-4-iodoaniline; 2-amino-4-bromoaniline; 2-amino-4-bromothiophenol; 2-amino-4-iodothiophenol; 2-amino-5-iodophenol; 2-amino-5-bromophenol; 2-amino-5-iodothiophenol; 2-amino-5-bromothiophenol; 2-hydroxy-4'-iodo-diphenylamine; 2-amion-4'-iododiphenylamine; 2-amino-5-(4-iodophenyl)thiophenol; and 2-hydroxy-4-iodoaminodiphenylether.

Although reactants are discussed herein as individual compounds, the method of this application is not limited to reactions utilizing individual compounds as reactants, but is also inclusive of reactions utilizing mixtures of compounds as reactants. The method of the invention is not limited to any particular aromatic halide or combination of aromatic halides, nor to any particular aromatic amine or combination of aromatic amines, however, it is necessary that a selected aromatic halide and aromatic amine react under the reaction conditions employed to form the poly(benz(ox, imid, thi)azole). It is desirable that the reactants be sufficiently stable under the reaction conditions employed and that the reactants not be subject to an unacceptable amount of undesirable side reactions, to prevent the formation of an unacceptable amount of by-product. It is also desirable that the reactants be free of groups which unduly retard the reaction by steric hindrance or by lowering the activity of the catalyst.

The reactants are contacted with carbon monoxide. The carbon monoxide may be at atmospheric pressure or at a higher pressure. Carbon monoxide pressures in the range of from about 1 to about 200 atmospheres or higher can be used in the process. Pressures lower than atmospheric can be used if desired, but generally do not confer any advantage. It is convenient to add an excess of carbon monoxide to the reaction zone. The excess of carbon monoxide need not be measured; one may merely pressurize the vessel with carbon monoxide to the desired reaction pressure.

In the disclosed embodiments of the invention, the reaction step is conducted in the presence of an organic solvent, which appreciably dissolves both reactants to provide a liquid reaction medium, which facilitates the contacting of the reactants and the catalyst. It is desirable that the solvent be "inert" to the reaction, i.e., that the solvent not enter into the reaction in an undesired way. The invention is not limited to a particular solvent or solvent system and a wide variety of organic compounds can be used. In a particular embodiment of the invention, exemplary solvents are hydrocarbon solvents, such as toluene and ether solvents, such as tetrahydrofuran, diglyme (2-methoxyethyl ether), and glyme (1,2-dimethoxyethane). In that embodiment of the invention, a more desirable solvent is dipolar and aprotic, that is, characterized by hydrogens that are not easily abstractable and a highly polar molecule. Exemplary dipolar aprotic solvents include dimethylformamide; dimethylacetamide; dimethylsulfoxide; 1,3-dimethyl-2-imidazolidinone; hexamethylphosphoramide; N-methylpyrrolidinone; N-cyclohexyl pyrrolidinone; dimethyl imidazolidinone; and the like.

The amount of solvent present is not critical to the reaction, however, it is desirable to use enough solvent to facilitate the reaction. Specific polymers may have optimum concentrations in various solvents. There is no theoretical upper limit on the amount of solvent employed, however, practical limits are imposed by the size of the reaction vessel, the ease of separation of product from the reaction medium, cost and other factors. It is ordinarily desirable that the amount of solvent used be within the range of from about 0.1 and about 1000 volumes based on the volume of aromatic halide used. It is also ordinarily desirable that the reaction medium be agitated, for example, by stirring to facilitate the adsorption of gaseous carbon monoxide.

The process of the invention is carried out in the presence of a catalyst. The catalyst is preferentially a palladium compound, where palladium is present in the zero valent or divalent state. However, other Group 8-10 transition metal catalysts, e.g., platinum and nickel catalysts can be used. The palladium catalysts generally have one or more ligands bonded to one or more palladium atoms by ionic or covalent bonds. Simple palladium salts such as $PdX_2$, in which X is Cl, Br or I, can be used. Other representative palladium catalysts are listed below.

TABLE 1

| Palladium catalysts | |
|---|---|
| $Pd^{+2}$ | |
| $PdX_2L_2$ | X = Cl, Br, I |
| | L = $R_3P$, where R = alkyl or aryl |
| $Pd(OAc)_2$ | OAc = acetate |
| $Pd(OAc)_2L_2$ | OAc = acetate |
| $PdCl_2(RCN)_2$ | R = $CH_3$, Phenyl |
| $PhPdXL_2$ | X = Br, I |
| $PdCl_2(COD)_2$ | COD = cis, cis-1,5-cyclooctadiene |
| $Pd(acac)_2$ | acac = 2,4-pentanedionate |
| $PdCl_2DPPF$ | DPPF = 1,1'-bis(diphenylphosphino)ferrocene |
| $PdCl_2DPPE$ | DPPE = 1,2-bis(diphenylphosphino)ethane |
| $PdCl_2DPPP$ | DPPP = 1,3-bis(diphenylphosphino)propane |
| $PdCl_2DPPB$ | DPPB = 1,4-bis(diphenylphosphino)butane |
| $Pd^{(0)}$ | |
| $PdL_4$ | L = $R_3P$, where R = alkyl or aryl |
| $Pd_2(\text{PhCH=CH-CO-CH=CHPh})_3$ | |
| $Pd(DPPE)_2$ | DPPE = 1,2-bis(diphenylphosphino)ethane |
| $Pd(DPPP)_2$ | DPPP = 1,3-bis(diphenylphosphino)propane |
| $Pd(DPPB)_2$ | DPPB = 1,4-bis(diphenylphosphino)butane |

A catalytic amount of catalyst is employed. By "catalytic amount" is meant an amount of catalyst which catalyzes the reaction to the desired extent. Generally, the amount of catalyst is at least about 0.0001 mole percent based on the amount of aromatic halide. There are no real upper or lower limits on the amount of catalyst, this being defined by secondary considerations such as cost and ease of separation of the catalyst from products and unreacted reactants. A preferred catalytic amount is from about 0.005 to about 0.20 moles per mole of aromatic halide. The catalyst may be bound to a support or unsupported.

The reaction can take place in the presence of an activating ligand, such as phosphine or arsine ligand. Such a ligand can be used with a catalyst, for example, triphenylphosphine with bis(triphenylphosphine) palladium(II) chloride, to increase the rate of the catalyzed reaction. The amount of ligand used is desirably between about 0.01 mole and about 5.0 moles per mole of metal catalyst, and more desirably at about 2 moles per mole of metal catalyst. It is believed that the presence of the activating ligand speeds up the oxidative addition of such catalysts by making the catalyst more nucleophilic.

The process of this invention is preferably conducted in the presence of a base to neutralize byproduct hydrogen halide. The base may be a tertiary amine such as tributylamine, pyridine, 1,8-diazobicyclo[5,4,0]-7- undecene (DBU) or 1,5-diazabicyclo[4.3.0]non-5-one (DBN) or have the formula:

NR$_3$ wherein each R is independently selected from lower alkyl groups having from about 2 to about 6 carbon atoms. The base may be immobilized on a cross-linked polymer such as cross-linked poly(vinylpyridine) beads. Alternatively, the base may be another type of basic substance which does not react with the reactants, e.g., a metal carbonate such as $K_2CO_3$ or a metal hydroxide such as $Ca(OH)_2$ or a metal acetate such as sodium acetate. Generally, one employs at least enough base to react with the by-product hydrogen halide produced. An excess can be used, if desired.

As with the reactants, solvents and catalysts, a skilled practitioner will recognize that the exact structure of the base is not critical, and the examples of compounds set forth above are merely illustrative and not-limiting examples of materials that can be used in this invention. A skilled practitioner will recognize that other materials can be substituted in this invention to achieve similar results.

The process of this invention is preferably conducted at a reaction temperature within the range of from about room temperature, i.e., about 20° C., to about 250° C. A desirable temperature range is from about 70° C. to about 150° C. A skilled practitioner will recognize that the reaction temperature is not critical, and that temperatures outside this range can be employed, if desired. Generally, one selects a reaction temperature which affords a reasonable rate of reaction and which does not give an undue amount of decomposition of products or reactants. A cyclization temperature is selected similarly.

The cyclization may be accomplished thermally or chemically. In the former instance, the precyclization polymer is subjected to a cyclization temperature at which water is released and cyclization occurs. The cyclization is preferably conducted at a temperature within the range of about 200° C. to 450° C. Cyclization may be effected on solvent free precyclization polymer material or the precyclization polymer may be dissolved in a suitable solvent and, for example, cast as a film on a suitable substrate and heated in an oven to give a tough, flexible film of cyclized polymer. Alternatively, cyclization can be induced by treatment of the precyclization polymer with strong acid. For example, the precyclization polymer may be dissolved in poly(phosphoric acid), stirred, heated and then precipitated into water to give the cyclized polymer.

The reaction time is not a truly independent variable but is dependent at least to some extent on the other reaction parameters selected such as the reactivity of the reactants, activity and amount of catalyst, reaction temperature, pressure and so forth. Generally, reaction times within the range of from about 0.1 to about 100 hours are used. However, it is a particularly advantageous feature of this invention that high molecular weight polymers can be prepared in less than about 5 hours, and in some instances, in less than about 2 hours.

In particular embodiments of the method of the invention, a salt can be added to the reaction medium. The salt imparts solubility to the heterocyclic precyclization polymer, presumably by breaking up hydrogen bonding on the polymer chains. It is desirable to keep the polyamide in solution from the standpoint of process efficiency. Suitable salts include salts of lithium such as LiCl, LiBr, and $CaCl_2$.

The method of the invention is not limited by a particular theory or explanation, however, a theoretical explanation can be provided. It is believed that method of the invention includes the following reaction mechanism sequence, in which the precyclization polymer formation step further comprises an oxidative addition step, a carbon monoxide insertion step and a coupling step as illustrated below for the reaction of meta-diiodobenzene and 3,3'dihydroxy-4,4'-diaminobiphenyl:

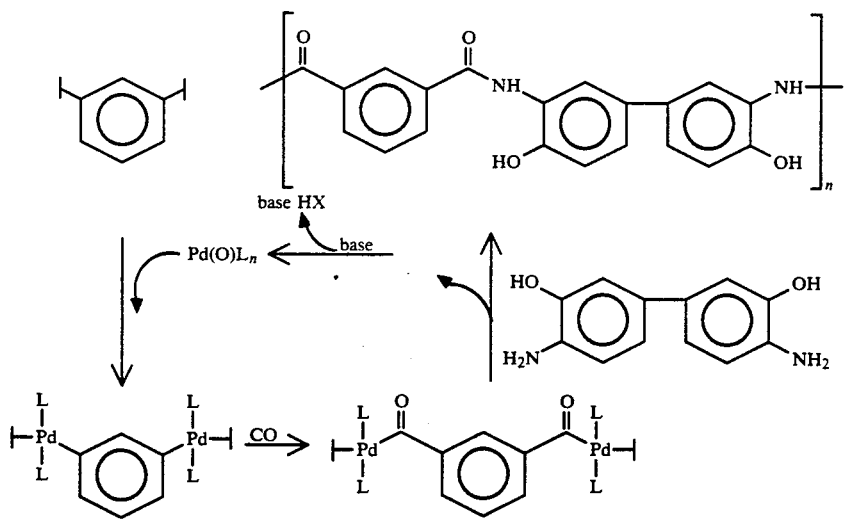

The precyclization polymer formation step is followed by the cyclization step:

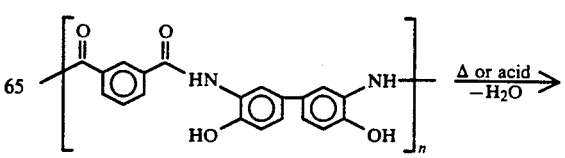

-continued

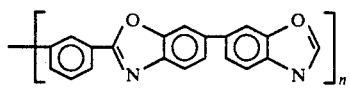

More specifically, a palladium(O) catalyst, which may be introduced as a palladium(O) complex or as a palladium(II) species which is subsequently reduced in situ, undergoes oxidative addition to m-diiodobenzene generating an aryl palladium(II) iodide intermediate. The ligands on palladium may be CO, phosphines or amines. Since the palladium catalyst is present in small quantities relative to the m-diiodobenzene, it is unlikely that a bis(aryl palladium(II) iodide) intermediate will be formed to any great degree, but the oxidative addition reaction will take place at both iodides at some point during the reaction. Then CO insertion occurs to generate an acyl palladium(II) iodide complex. As before, little of the bis(acyl palladium(II) iodide) complex will be present. This electrophilic acyl palladium complex is then attacked by 3,3'-dihydroxy-4,4'-diaminobiphenyl in the coupling reaction. The HI which is liberated is neutralized by the added base (DBU) and the palladium(O) catalyst is regenerated. It is most likely that the reaction to give the precyclization polymer occurs through the amine functionality, rather than the hydroxy group, because the amine is more nucleophilic. After cyclization though, any distinction between the two modes of attachment would be lost.

The following examples are presented for a further understanding of the invention:

EXAMPLES

Preparation of Material 2-amino-4-iodophenol was prepared by the HCl and SnCl2 reduction of 2-nitro-4-iodophenol which was obtained from the nitration of p-iodophenol.

EXAMPLE 1

The precyclization polymer forming reaction was performed in a three ounce Fischer-Porter pressure reaction vessel, containing a stir bar and fitted with a pressure gauge, a pressure release valve, a gas inlet and a straight ball valve for degassing and sample withdrawal. The vessel was charged with the aromatic amine reactant, aromatic halide reactant, catalyst and solvent. The reaction mixture was stirred, degassed, placed under a carbon monoxide (CO) atmosphere and heated to 120° C. When the contents of the vessel had dissolved, the base was added and the vessel charged to 7.7 kg/cm² CO. The reaction was allowed to proceed for the reaction time indicated in Table 2. At the end of the reaction time the vessel was examined for the presence of precipitate. Precipitate was noted and additional N,N-dimethylacetamide (DMAc) was added as dilutant. The contents of the bottle were then filtered through a medium frit sintered glass funnel and the filtrate was concentrated in vacuo.

A portion of the filtrate was then precipitated into and washed with methanol and dried in vacuo, to isolate a solid precyclization polymer. The inherent viscosity of the precyclization polymer was determined by analyzing a 0.25 weight/weight percent DMAc solution of the precyclization polymer at 25° C., with a Schott Gerate 526-10 viscometer. Size exclusion chromatography data was obtained from a Waters HPLC using μ-styragel columns of $10^6, 10^5, 10^4, 10^3$ Angstroms calibrated against poly(methylmethacrylate) standards to obtain molecular weight determinations, which are referred to herein as "$M_n$" or "number average molecular weight" and "$M_w$" or "weight average molecular weight". Infrared spectra were recorded on a Nicolet 5ZDX spectrometer as KBr pellets. Measurements are presented in TABLE 3.

Another portion of the filtrate was cast onto glass plates as a thin film, dried in air overnight and cured in a vacuum oven for one hour each at 100° C., 200° C. and 325° C. to cyclize the polymer. A ramp of 10° C./min. between curing temperatures was provided. Thermogravimetric analyses were made on an Omnitherm Atvantage II under a flow of 60 milliliter of nitrogen gas per minute and a gradient of temperature increase of 10° C. per minute from 25° C. to 1000° C. Infrared spectra of the film sample were recorded on a BioRad 3240-SPC Photoacoustic IR spectrometer. Measurements are presented in TABLE 4.

Specific information as to compounds and amounts and other aspects of the precyclization polymer forming reaction for EXAMPLES 1-6 is indicated in TABLE 2. Information relating to the precyclization polymers formed in EXAMPLES 1-6 is presented in TABLE 3. Information relating to the cyclized polymers formed in EXAMPLES 1-6 is presented in TABLE 4. Information relating to EXAMPLES 7-9 is presented in TABLE 5. Structural formulas of reactants and repeating units of cyclized polymers supported by the results of EXAMPLES 1-9 are presented in TABLE 6.

EXAMPLE 2

The same procedures were followed as in EXAMPLE 1, with the exception that the filtrate was not concentrated in vacuo.

EXAMPLE 3

The same procedures were followed as in EXAMPLE 2, with the exception that precipitate was not observed and dilutant was not added and curing temperatures were 100° C., 200° C. and 280° C.

EXAMPLE 4

The same procedures were followed as in EXAMPLE 2, with the exception that precipitate was not observed and dilutant was not added and filtrate was precipitated into methylene chloride rather than methanol.

EXAMPLE 5

The same procedures were followed as in EXAMPLE 2, with the exception that precipitate was not observed and dilutant was not added.

EXAMPLE 6

The same procedures were followed as in EXAMPLE 2 with the exceptions that aromatic amine reactant and the aromatic halide reactant were replaced by aromatic halide-amine reactant and that a large amount of solid black precipitate was noted at the end of the reaction time. Dilutant was not added to the vessel. The precipitate was removed by use of the filter aid.

TABLE 2

| EXAMPLE | 1 | 2 | 3 | 4 | 5 | 6 |
|---|---|---|---|---|---|---|
| Aromatic halide concentration (millimolar) | | | | | | |
| 4,4'diiodo | 4.74 | — | — | — | — | — |

TABLE 2-continued

| EXAMPLE | 1 | 2 | 3 | 4 | 5 | 6 |
|---|---|---|---|---|---|---|
| diphenylether m-diiodobenzene | — | 5.70 | — | 6.49 | — | — |
| m-dibromobenzene | — | — | 5.70 | — | — | — |
| 2,8-diiodo dibenzofuran | — | — | — | — | 3.63 | — |
| Aromatic halide-amine concentration (millimolar) | | | | | | |
| 2-amino-4-iodo-phenol | — | — | — | — | — | 3.44 |
| Aromatic amine concentration (millimolar) | | | | | | |
| 3,3'diamino-4,4'-diamino biphenyl | 4.74 | — | — | — | — | — |
| 3,3'dihydroxy-4,4'-diamino biphenyl | — | 5.70 | 5.70 | — | 3.63 | — |
| 2,2-bis(3-amino-4-hydroxyphenyl) hexafluoro propane | — | — | — | 6.49 | — | — |
| Solvent volume (in milliliters) | | | | | | |
| Dimethyl acetamide | 14.4 | 14.5 | 14.5 | 19.2 | 11.0 | 10.4 |
| Carbon monoxide pressure (in kg/cm$^2$) | 7.7 | 7.7 | 7.7 | 7.7 | 7.7 | 7.7 |
| Catalyst and ligand concentrations (millimolar) | | | | | | |
| bis(triphenyl phosphine) palladium(II) chloride | 0.142 | 0.142 | 0.142 | 0.195 | 0.109 | 0.105 |
| triphenyl phosphine | 0.284 | 0.284 | 0.284 | 0.390 | 0.218 | 0.210 |
| Base concentration (millimolar) | | | | | | |
| 1,8-diazabicyclo [5.4.0] undec-7-ene | 11.4 | 13.7 | 13.7 | 15.6 | 8.7 | 4.2 |
| Reaction temperature (in °C.) | 120° | 120° | 120° | 120° | 120° | 120° |
| Reaction time (in hours) | 1.25 | 2.5 | 5.75 | 2.0 | 4.0 | 5.5 |
| Dilutent volume (in milliliters) | | | | | | |
| Dimethyl acetamide | 20 | 10 | — | — | — | — |

TABLE 3

| EXAMPLE | 1 | 2 | 3 | 4 | 5 | 6 |
|---|---|---|---|---|---|---|
| $\eta_{inh}$ | 0.70 | 0.58 | 0.26 | 0.19 | 0.21 | 0.25 |
| $M_n$ | 7,600 | 5,800 | 12,100 | 3,600 | 5,600 | — |
| $M_w$ | 95,400 | 15,800 | 30,900 | 5,500 | 12,100 | — |
| Infrared absorption peaks (in cm$^{-1}$) | 3340 | 3410 | 3410 | 3260 | 3400 | 3400 |
| | 1650 | 1650 | 1645 | 1650 | 1645 | 1645 |
| | 1600 | 1610 | 1610 | 1610 | 1605 | 1590 |
| | 1500 | 1510 | 1510 | 1530 | 1520 | 1550 |
| | 1310 | 1405 | 1325 | 1515 | 1480 | 1500 |
| | 1240 | 1325 | 805 | 1435 | 1325 | 1435 |
| | 1170 | 1230 | | 1325 | 1200 | 1325 |
| | | 800 | | 1250 | | 1255 |
| | | | | 1195 | | 1110 |
| | | | | 1160 | | |
| | | | | 1130 | | |

TABLE 4

| EXAMPLE | 1 | 2 | 3 | 4 | 5 | 6 |
|---|---|---|---|---|---|---|
| Initial cyclization temperature (°C.) | 435 | 340 | 335 | 335 | 325/350 | 350/380 |
| Theoretical weight loss (percent) | 8.2 | 10.4 | 10.4 | 7.2 | 8.6 | 13.3 |
| Actual weight loss (percent) | 6.8 | 11.4 | 16.8 | 11.1 | 16.9 | 37.8 |
| Decomposition onset of cyclized polymer (temperature in °C. at 5% weight loss) | 500 | 606 | 690 | 612 | 700 | 650 |
| Infrared absorption peaks (in cm$^{-1}$) | 3250 | 2230 | 3000 | 1640 | 3100 | 3420 |
| | 1625 | 1610 | 1610 | 1550 | 1630 | 1645 |
| | 1490 | 1560 | 1590 | 1470 | 1600 | 1605 |
| | 1250 | 1470 | 1500 | 1440 | 1510 | 1500 |
| | 850 | 1420 | 1460 | 1260 | 1470 | 1470 |
| | | 1260 | 1400 | 1240 | 1410 | 1435 |
| | | 820 | 1310 | 1140 | 1320 | 1265 |
| | | | 1240 | 1050 | 1260 | 1105 |
| | | | 820 | 970 | 1195 | 820 |
| | | | 800 | 850 | 1120 | |
| | | | 700 | 810 | 1020 | |
| | | | | 730 | 800 | |

EXAMPLES 7-9

The same procedures were followed as described above for EXAMPLE 5 with the exception that only inherent viscosity and decomposition temperature were measured. Details are presented in Table 5.

TABLE 5

| EXAMPLE | 7 | 8 | 9 |
|---|---|---|---|
| Aromatic halide concentration (millimolar) | | | |
| 4,4'diiododiphenylether | 3.00 | 3.00 | 3.00 |
| Aromatic amine concentration (millimolar) | | | |
| 2,2-bis(3-amino-4-hydroxyphenyl) hexafluoropropane | 3.00 | 3.00 | 3.00 |
| Solvent volume (in milliliters) | | | |
| Dimethylacetamide | 18 | 18 | — |
| N-methylpyrrolidinone | — | — | 18 |
| Carbon monoxide pressure (in kg/cm$^2$) | 7.7 | 7.7 | 7.7 |
| Catalyst concentration (millimolar) | | | |
| bis(triphenylphosphine) palladium(II) chloride | 0.005 | — | .005 |
| 1,2-bis(diphenyl-phosphino) ethane | — | 0.005 | — |
| Base concentration (millimolar) | | | |
| 1,8-diazabicyclo [5.4.0] undec-7-ene | 7.22 | 7.22 | 7.22 |
| Reaction temperature (in degrees C.) | 120° | 120° | 120° |
| Reaction time (in hours) | 6.0 | 5.0 | 5.3 |
| $\eta_{inh}$ | 0.59 | 0.62 | 0.72 |
| Decomposition onset of cyclized polymer (in °C. at 5% weight loss) | 530° | 532° | 530° |

Table 6 shows the structural formulas for the reactants of Examples 1-9 and the repeating unit structural formulas of polymers produced by the method of the invention and supported by the data presented in Tables 4 and 5.

TABLE 6

| EXAMPLE | | |
|---|---|---|
| 1 | Aromatic halide [structure: I—C6H4—O—C6H4—I] | Aromatic amine [structure: 3,3',4,4'-tetraaminobiphenyl] |
| | Polymer (after cyclizing) [structure: polybenzimidazole with diphenyl ether linkage] | |
| 2 | Aromatic halide [structure: m-diiodobenzene] | Aromatic amine [structure: 3,3'-dihydroxy-4,4'-diaminobiphenyl] |
| | Polymer (after cyclizing) [structure: polybenzoxazole with m-phenylene linkage] | |
| 3 | Aromatic halide [structure: m-dibromobenzene] | Aromatic amine [structure: 3,3'-dihydroxy-4,4'-diaminobiphenyl] |
| | Polymer (after cyclizing) [structure: polybenzoxazole with m-phenylene linkage] | |
| 4 | Aromatic halide [structure: m-diiodobenzene] | Aromatic amine [structure: 2,2-bis(3-amino-4-hydroxyphenyl)hexafluoropropane] |
| | Polymer (after cyclizing) [structure: polybenzoxazole with hexafluoroisopropylidene linkage] | |
| 5 | Aromatic halide [structure: diiododibenzofuran] | Aromatic amine [structure: 3,3'-dihydroxy-4,4'-diaminobiphenyl] |
| | Polymer (after cyclizing) [structure: polybenzoxazole with dibenzofuran linkage] | |

TABLE 6-continued

| EXAMPLE | | |
|---|---|---|
| 6 | Aromatic halide-amine (2-amino-phenol with I) | Polymer (after cyclizing) (benzoxazole) |
| 7-9 | Aromatic halide (4,4'-diiododiphenyl ether) | Aromatic amine (2,2'-bis(3-hydroxy-4-aminophenyl)hexafluoropropane) |
| | Polymer (after cyclizing) (poly-benzoxazole with hexafluoroisopropylidene and diphenyl ether linkages) | |

EXAMPLES 10-16

The same procedures were followed as described above for EXAMPLE 5. Carbon monoxide pressure was 7.7 kg/cm$^2$, temperature was 115-120° C., base used was 7.2 millimolar DBU. Infrared spectra were recorded on a Nicolet 5ZDX spectrometer as KBr pellets Before cyclization the polymers of Examples 10-16 showed infrared absorption peaks at 3413, 3269, 1646, 1596, 1495, 1435, 1245, and 1169 (all in cm$^{-1}$). After cyclization the polymers of Examples 10-16 showed infrared absorption peaks at 1600, 1490, 1244, 1231, 1196, 1167, 1137, 1051, 807, and 725 (all in cm$^{-1}$). Additional information on Examples 10-16 is presented in Table 7.

EXAMPLES 17-25

The same procedures were followed as described above for EXAMPLE 5. For Examples 17-25, the solvent used was DMAc, carbon monoxide pressure was 7.7 kg/cm$^2$. No additional ligand was used. In Examples 20-21 LiCl was added to get polymer back into solution for reprecipitation and viscosity measurements. Additional information on Examples 17-25 is presented in Table 8.

TABLE 7

| EXAMPLE | 10 | 11 | 12 | 13 | 14 | 15 | 16 |
|---|---|---|---|---|---|---|---|
| Aromatic halide concentration 4,4'diiododiphenylether (millimolar) | 3.00 | 3.00 | 3.00 | 3.00 | 3.00 | 3.00 | 3.00 |
| Aromatic amine concentration 2,2'-bis(3-hydroxy-4-aminophenyl) hexafluoropropane (millimolar) | 3.00 | 3.00 | 3.00 | 3.00 | 3.00 | 3.00 | 3.00 |
| Solvent | | | | | | | |
| Dimethylacetamide | Yes | Yes | Yes | No | Yes | Yes | Yes |
| Dimethylformamide | No | No | No | Yes | No | No | No |
| Catalyst and ligand concentrations (millimolar) | | | | | | | |
| PdCl$_2$L$_2$ | .005 | .0014 | .0007 | .005 | — | — | — |
| PdCl$_2$DPPE | — | — | — | — | .005 | — | — |
| Pd(OAc)$_2$ | — | — | — | — | — | .005 | .005 |
| triphenyl phosphine | — | — | — | — | — | — | .010 |
| Reaction time (in hours) | 6 | 6 | 7 | 5.3 | 5.3 | 6 | 6 |
| Yield (%) | 87 | 86 | 74 | 80 | 86 | 87 | 94 |
| $\eta_{inh}$ | 0.57 | 0.60 | 0.51 | 0.59 | 0.62 | 0.42 | 0.58 |
| $M_n$ | 27,700 | 29,700 | 28,500 | 34,100 | 34,500 | 22,900 | 31,700 |
| $M_w$ | 52,000 | 53,300 | 45,500 | 54,000 | 58,500 | 43,000 | 56,500 |
| Decomposition onset of cyclized polymer (degrees C. at 5% weight loss) (temperature ramp of 10° C./min. in N$_2$) | 480 | 550 | 560 | 540 | 540 | 565 | 560 |

TABLE 8

| EXAMPLE | 17 | 18 | 19 | 20 | 21 | 22 | 23 | 24 | 25 |
|---|---|---|---|---|---|---|---|---|---|
| Aromatic halide concentration (millimolar) | | | | | | | | | |
| 2,8-diiododibenzofuran | 3.00 | — | — | — | — | — | — | — | — |
| 2,6-diiodonaphthalene | — | 3.00 | — | — | — | — | — | — | — |
| 4,4'-diiododiphenylsulfone | — | — | 3.00 | — | — | — | 3.00 | — | 3.00 |
| 4,4'-diiodobiphenyl | — | — | — | 3.00 | — | — | — | — | — |
| 4,4'-diiododiphenylether | — | — | — | — | 3.00 | 3.00 | — | — | — |

TABLE 8-continued

| EXAMPLE | 17 | 18 | 19 | 20 | 21 | 22 | 23 | 24 | 25 |
|---|---|---|---|---|---|---|---|---|---|
| m-diiodobenzene | — | — | — | — | — | — | — | 3.00 | — |
| Aromatic amine concentration (millimolar) | | | | | | | | | |
| 2,2'-bis(3-hydroxy-4-aminophenyl) hexafluoropropane | 3.00 | 3.00 | 3.00 | 3.00 | — | — | — | — | — |
| 3,3'-dihydroxy-4,4'-diaminobiphenyl | — | — | — | — | 3.00 | — | — | — | — |
| 1,4-diamino-2,5-dithiobenzene | — | — | — | — | — | 3.00 | 3.00 | — | — |
| 3,3',4,4'-tetraaminobiphenyl | — | — | — | — | — | — | — | 3.00 | 3.00 |
| Catalyst (millimolar) | .030 | .030 | .030 | .030 | .030 | .045 | .045 | .030 | .030 |
| Base (millimolar) | | | | | | | | | |
| DBU | 7.2 | 7.2 | 7.2 | 7.2 | 7.2 | 14.4 | 14.4 | — | — |
| 2,6-lutidine | — | — | — | — | — | — | — | 7.2 | 7.2 |
| Reaction temperature (in degrees C.) | 115-120 | 115-120 | 115-120 | 115-120 | 115-120 | 120 | 120 | 140 | 140 |
| Reaction time (in hours) | 6 | 3 | 5 | 5 | 4 | 22 | 22 | 24 | 24 |
| Yield (%) | 49 | 95 | 96 | About 100 | About 100 | 37 | 99 | 34 | 35 |
| $\eta_{inh}$ | — | 0.46 | 0.34 | 0.34 | 1.52 | — | — | — | — |
| $M_n$ | 22,700 | 28,900 | 25,500 | 19,500 | 12,500 | 16,100 | 10,700 | — | — |
| $M_w$ | 33,900 | 49,500 | 42,000 | 39,100 | 34,100 | 26,300 | 23,000 | — | — |
| Decomposition onset of cyclized polymer (degrees C. at 5% weight loss) (temperature ramp of 10° C./min. in $N_2$) | — | 530 | 455 | 515 | — | — | — | 440 | 430 |
| Infrared absorption peaks (in $cm^{-1}$) | | | | | | | | | |
| Before cyclization | 1645 | 1647 | 1648 | 1647 | 1646 | 1645 | 1645 | 3396 | 3370 |
| | 1603 | 1605 | 1607 | 1608 | 1596 | 1594 | 1605 | 3190 | 3193 |
| | 1513 | 1536 | 1538 | 1538 | 1520 | 1491 | 1575 | 1623 | 1621 |
| | 1434 | 1435 | 1487 | 1490 | 1493 | 1368 | 1481 | 1520 | 1600 |
| | 1324 | 1324 | 1436 | 1435 | 1242 | 1237 | 1393 | 1442 | 1424 |
| | 1251 | 1251 | 1325 | 1326 | 1170 | 1167 | 1315 | 1285 | 1290 |
| | 1196 | 1198 | 1252 | 1252 | | | 1155 | 798 | 1155 |
| | 1130 | 1129 | 1194 | 1195 | | | 1073 | | 1095 |
| | 821 | 821 | 1161 | | | | 763 | | 808 |
| | | | 1092 | | | | 622 | | 757 |
| | | | 746 | | | | | | 620 |
| After cyclization | 1646 | 1627 | 1603 | 1619 | 1645 | 1646 | 1575 | 3050 | 3060 |
| | 1477 | 1543 | 1554 | 1478 | 1595 | 1594 | 1472 | 1623 | 1620 |
| | 1251 | 1478 | 1479 | 1251 | 1487 | 1480 | 1389 | 1533 | 1597 |
| | 1193 | 1251 | 1252 | 1227 | 1240 | 1401 | 1300 | 1443 | 1419 |
| | 1130 | 1228 | 1230 | 1195 | 1164 | 1226 | 1150 | 1286 | 1284 |
| | 820 | 1197 | 1196 | 1135 | 809 | 1166 | 1073 | 801 | 1150 |
| | 724 | 1130 | 1135 | 1055 | | 1103 | 1009 | 688 | 1092 |
| | | 1043 | 1050 | 807 | | 836 | 816 | | 802 |
| | | 880 | 810 | | | 738 | 762 | | 756 |
| | | 801 | | | | | 621 | | 618 |
| | | | | | | | | | 562 |

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto.

What is claimed is:

1. A method for preparing a polymer comprising the step of reacting, carbon monoxide, an aromatic halide reactant having the general formula $$X^1—Ar^1—Z^1$$

and an aromatic amine reactant having the general formula $$Z^2—Ar^2—M^1,$$

wherein $X^1$ and $Z^1$ are non-ortho;
$Z^2$ and $M^1$ are non-ortho,
one of $Z^1$ and $Z^2$ is $X^2$ and the other one is $M^2$,
—$Ar^1$— and —$Ar^2$— are each independently selected from the group consisting of aromatic and heteroaromatic moieties having a total of ring carbons and heteroatoms of from 6 to about 20,
—$X^1$ and —$X^2$ are each independently selected from the group consisting of —I and —Br,
—$M^1$ and —$M^2$ are each independently selected from moieties having an —$NH_2$ radical and, ortho to said —$NH_2$ radical, a radical selected from the group consisting of —$NH_2$, —OH, and —SH, in the presence of solvent and catalyst, said catalyst being selected from the group consisting of platinum compounds, nickel compounds, and palladium compounds.

2. The method of claim 1 wherein —$Ar^1$— and —$Ar^2$— are each independently selected from the group consisting of arylene and heteroarylene, and fused and linked arylene and heteroarylene, wherein said linked arylene and linked heteroarylene have a direct linkage or said linked arylene and linked heteroarylene are linked by a bridge member selected from the group consisting of alkyl having 1 to 10 carbons, haloalkyl having 1 to 10 carbons, O, S, $SO_2$, carbonyl, aryl, heteroaryl, fused aryl, siloxane, ester, and amide.

3. The method of claim 1 wherein —$Ar^1$— and —$Ar^2$— are each independently selected from the group consisting of arylene and heteroarylene groups having five or six membered rings or fused or linked systems of said five or six membered rings.

4. The method of claim 1 further comprising neutralizing by-product hydrogen halide.

5. The method of claim 1 further comprising reacting said reactants at a carbon monoxide pressure greater than atmospheric pressure.

6. The method of claim 1 further comprising, subsequent to said reacting step, the step of cyclizing the product of said reaction.

7. The method of claim 6 further comprising, subsequent to said reacting step, the step of thermally cyclizing the product of said reaction.

8. The method of claim 1 wherein said aromatic halide reactant is selected from the group consisting of 4,4′diiododiphenylether; m-diiodobenzene; m-dibromobenzene; 2,8-diiododibenzofuran; 2,6-diidonaphthalene; p-diiodobenzene; p-dibromobenzene; 4,4′-diiododiphenylsulfone; 4,4′-diidobiphenyl; 4,4′diiodobenzophenone; 4,4′diiodophenylmethane; 9,9-Bis(4-iodophenyl)-fluorene; 2,2-Bis(4-iodophenyl)propane; 2,2-bis(4-iodophenyl)hexafluoropropane; 5-iodo-3-(4-iodophenyl)-1,1,3-trimethylindane; 3,4′-diiododiphenylether; and 4,4′-dibromodiphenylsulfone.

9. The method of claim 1 wherein said aromatic amine reactant is selected from the group consisting of 3,3′,4,4′-tetraminobiphenyl; 3,3′dihydroxy-4,4′-diaminobiphenyl; 2,2-bis(3-amino-4-hydroxyphenyl) hexafluoropropane, 3,3′-di(thio)4,4′-diaminobiphenyl; 3,3′diamino-4,4′-dihydroxybiphenyl; 1,4-diamino-2,5-dihydroxybenzene; 1,5-diamino-2,4-dihydroxybenzene; 1,4-diamino-2,5-dithiobenzene; 1,5-diamino-2,4-dithiobenzene; and 3,3′-diamino-4,4′-dithiobiphenyl.

10. A method for preparing a poly(benz(ox, imid, thi)azole) comprising the step of reacting, carbon monoxide, a substituted aromatic halide reactant having at least two non-ortho halogen substituents selected from the group consisting of —Br and —I and an aromatic amine reactant of the general formula

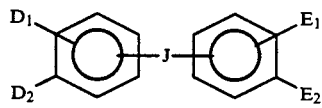

wherein
one of said D radicals is NH₂ and the other said D radical is selected from the group consisting of —NH₂, —OH, and —SH,
one of said E radicals is NH₂ and the other said E radical is selected from the group consisting of —NH₂, —OH, and —SH,
and J is a direct linkage of J is a bridge member,
in the presence of base, solvent, and catalyst selected from the group consisting of platinum compounds, nickel compounds, and palladium compounds.

11. The method of claim 10 wherein said bridge member is selected from the group consisting of alkyl having 1 to 10 carbons, haloalkyl having 1 to 10 carbons, O, S, SO₂, carbonyl, arylene, heteroarylene, fused arylene, siloxane, ester, and amide.

12. The method of claim 10 wherein said D₁ radical and said E₁ radical are the same.

13. The method of claim 12 wherein said D₂ radical and said E₂ radical are the same.

14. The method of claim 10 wherein said D2 radical and said E2 radical are the same.

15. The method of claim 10 wherein said aromatic halide reactant is selected from the group consisting of 4,4′diiododiphenylether; m-diiodobenzene; m-dibromobenzene; 2,8-diiododibenzofuran; 2,6-diidonaphthalene; p-diiodobenzene; p-dibromobenzene; 4,4′-diiododiphenylsulfone; 4,4′-diidobiphenyl; 4,4′diiodobenzophenone; 4,4′diiodophenylmethane; 9,9-Bis(4-iodophenyl)-fluorene; 2,2-Bis(4-iodophenyl)-propane; 2,2-bis(4-iodophenyl)hexafluoropropane; 5-iodo-3-(4-iodophenyl)-1,1,3-trimethylindane; 3,4′-diiododiphenylether; and 4,4′-dibromodiphenylsulfone.

16. The method of claim 10 wherein said aromatic amine reactant is selected from the group consisting of 3,3′, 4,4′-tetraminobiphenyl; 3,3′dihydroxy-4,4′-diaminobiphenyl; 2,2-bis(3-amino-4-hydroxyphenyl) hexafluoropropane, 3,3′-di(thio)4,4′-diaminobiphenyl; 3,3′diamino-4,4′-dihydroxybiphenyl; 1,4-diamino-2,5-dihydroxybenzene; 1,5-diamino-2,4-dihydroxybenzene; 1,4-diamino-2,5-dithiobenzene; 1,5-diamino-2,4-dithiobenzene; and 3,3′-diamino-4,4′-dithiobiphenyl.

17. A method for preparing a poly(benz(ox, imid, thi)azole) comprising the steps of reacting carbon monoxide, an aromatic halide reactant of the general formula

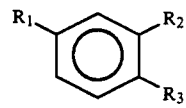

wherein
R1 is Br or I, R2 is —NH2, and R3 is —NH2, —SH, or OH or
R1 is Br or I, R2 is —NH2, —SH, or OH and R2 is NH2 and an aromatic amine reactant of the general formula

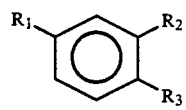

wherein
R1 is Br or I, R2 is —NH2, and R3 is —NH2, —SH, or OH or
R1 is Br or I, R2 is —NH2, —SH, or OH and R2 is NH2 in the presence of catalyst selected from the group consisting of platinum compounds, nickel compounds, and palladium compounds, base, and solvent.

18. The method of claim 17 wherein said aromatic halide reactant and said aromatic amine reactant are the same or different aromatic halideamine reactants selected from the group consisting of 2-amino-4-iodophenol; 2-amino-4-bromophenol; 2-amino-4-iodoaniline; 2-amino-4-bromoaniline; 2-amino-4-bromothiophenol; 2-amino-4-iodothiophenol; 2-amino-5-iodophenol; 2-amino-5-bromophenol; 2-amino-5-iodothiophenol; 2-amino-5-bromothiophenol; 2-hydroxy-4′-iododiphenylamine; 2-amion-4′-iododiphenylamine; 2-amino-5-(4-iodophenyl)thiophenol; and 2-hydroxy-4-iodoaminodiphenylether.

19. The method of claim 1 wherein said catalyst is a palladium compound having a palladium atom in the zero valent or divalent state.

20. The method of claim 1 wherein said catalyst is selected from the group consisting of PdCl$_2$, PdBr$_2$, PdI$_2$, PdCl$_2$(R$^1_3$P)$_2$, PdBr$_2$(R$^1_3$P)$_2$, PdI$_2$(R$^1_3$P)$_2$, Pd(R$^2$)$_2$, Pd(R$^2$)$_2$(R$^1_3$P)$_2$, PdCl$_2$(R$^3$CN)$_2$, PhPdBr(R$^1_3$P)$_2$, PhPdI(R$^1_3$P)$_2$, PdCl$_2$(cis, cis-1,5-cyclooctadiene)$_2$, Pd(2,4-pentanedionate)$_2$, PdCl$_2$(1,1'-bis(diphenylphosphino)ferrocene), PdCl$_2$(1,2-bis(diphenylphosphino)ethane), PdCl$_2$(1,3-bis(diphenylphosphino)propane), PdCl$_2$(1,4-bis(diphenylphosphino)butane), Pd(R$^1_3$P)$_4$, Pd$_2$

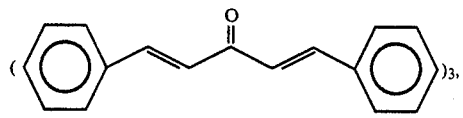

Pd(1,2-bis(diphenylphosphino)ethane)$_2$, Pd(1,3-bis(diphenylphosphino)propane)$_2$, and Pd(1,4-bis(diphenylphosphino)butane)$_2$, wherein R$^1$ is alkyl or aryl, R$^2$ is acetate, and R$^3$ is CH$_3$ or phenyl.

* * * * *